Feb. 21, 1967 T. R. NISBET 3,305,645

SYSTEM OF RECORDING PROGRAM CONTROL SIGNALS

Filed Dec. 26, 1962

INVENTOR.
THOMAS R. NISBET

BY Flehr and Swain

ATTORNEYS 3,305,645

SYSTEM OF RECORDING PROGRAM CONTROL SIGNALS

Thomas R. Nisbet, Palo Alto, Calif., assignor, by mesne assignments, to Edex Corporation, Mountain View, Calif., a corporation of Delaware Filed Dec. 26, 1962, Ser. No. 247,048
13 Claims. (Cl. 179—100.2)

This invention relates to a method and apparatus for preparing a record medium with control signals. More particularly, this invention relates to a method and means for selectively recording one or more signals of one kind, which are particularly useful, upon being played back in correlation with a pre-recorded lecture, to establish one of several predetermined functional circuits, and further to the subsequent selected recording of one or more signals of another kind, the latter being likewise useful upon reproduction, to energize the previously selected functional circuit so as to execute the function thereof. One system for using a record prepared in accordance herewith is disclosed in my copending application Serial No. 143,-867, now abandoned.

In the above-identified application there is described a lecture system using a record medium prepared with pre-recorded information such as instructional material, and control signals correlated therewith. Means are provided for reproducing the pre-recorded instructional material and the control signals. The control signals comprise pulses serving to select functions to be performed and so-called "command" pulses for activating the function selected. To utilize these pulses, there is provided a plurality of predetermined circuits. Each circuit serves to perform a related function whereby the "function selection" pulses selectively establish one of them. The "command" pulses are then applied to activate the selected function circuit. For example, circuits are provided for operating a slide projector, controlling room lights, connecting pushbuttons located at student stations with a score keeping arrangement whereby selection of the correct answer enters an appropriate value into the score keeping means, and also means whereby the weight of each correct answer can be correspondingly entered, etc.

In general it is an object of this invention to provide a system for preparing a record medium particularly useful in apparatus of the kind described.

It is another object of the invention to provide a method of preparing a magnetic recording medium by the manual manipulation of apparatus as disclosed herein.

It is another object of the invention to provide a recording system including signal selection apparatus for recording control signals, wherein the system is manually operated to select from a predetermined sequence one of a plurality of functions to be performed and for recording one or more command signals which will serve to execute the function selected when the medium is played back.

These and other objects will become more readily apparent from the following description and drawing in which.

Figures 1, 2:
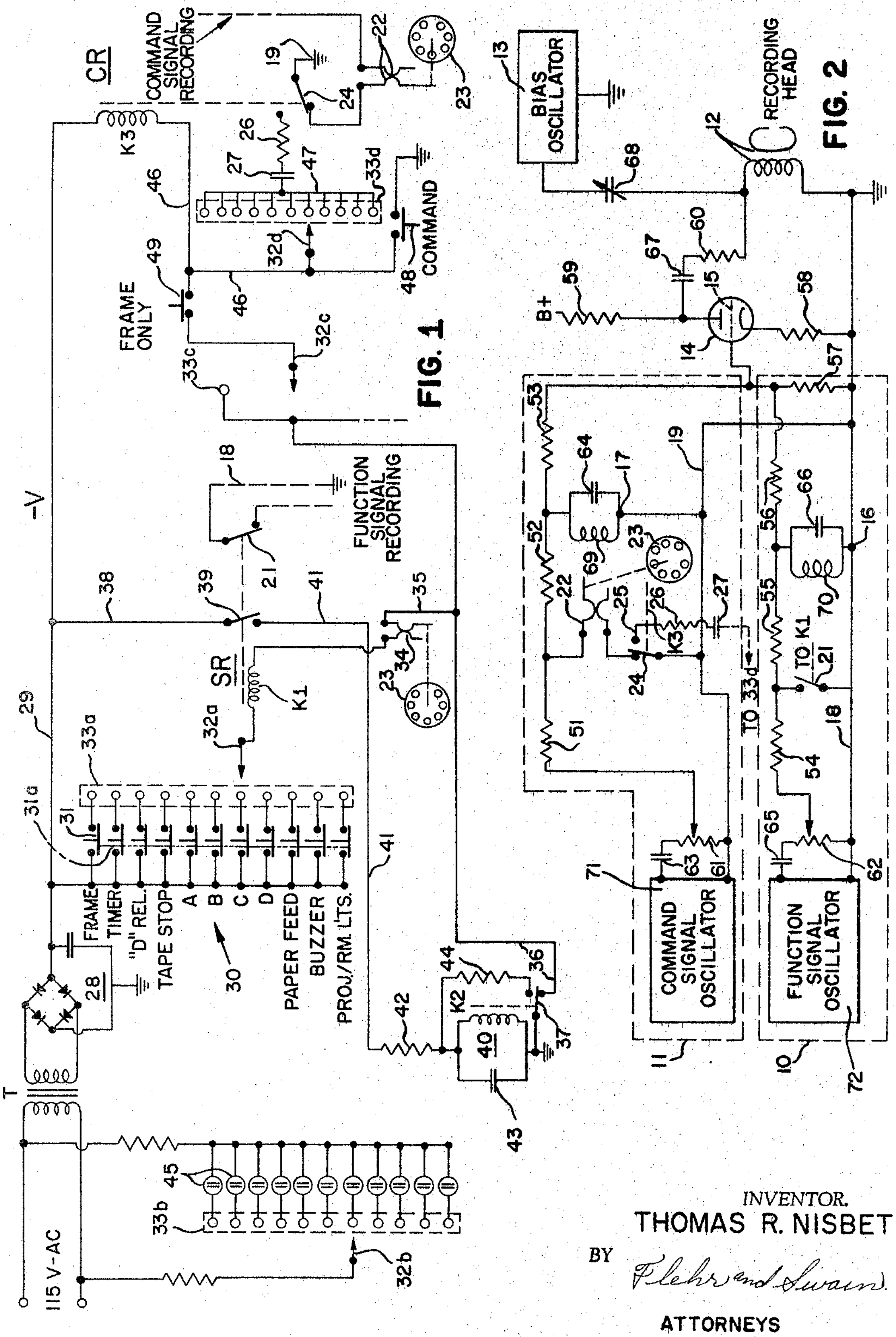
FIGURE 1 is a schematic circuit diagram showing a circuit for recording function and command signals of different frequencies respectively.
FIGURE 2 is a schematic circuit diagram of means for controlling the recording circuit shown in FIGURE 1.

Briefly stated a record medium is prepared by first recording information, such as a lecture, thereon and then reproducing the lecture in apparatus having means for recording one or more function selection signals, i.e., one or more relatively short pulses of substantially a single frequency, and then while listening to and in correlation with the lecture, recording one or more command signals of a distinguishably different frequency. The correlation of the lecture to the operation of the lecture system is achieved by using, for example, an elongate magnetic tape having a pair of record tracks thereon. The voice recording is applied to one of the tracks and the control signals along the other.

There is provided means for selecting one or the other of two kinds of signal. A manually operated register means is coupled to operate a recording transducer and serves to record a selected number of the function selection signals. Manually operated means are also coupled to the transducer and serve to record a selected number of command signals. Means for inhibiting recording of the function selection signals during the recording of the command signals have been provided.

In order to prepare the magnetic record with recorded function and command signals there is provided circuits 10 and 11. Circuits 10 and 11 are coupled to a transducer circuit including a magnetic recording head 12, bias oscillator 13 capacitively coupled thereto, and a triode amplifier 14. The control grid 15 of the amplifier is coupled to both circuits 10 and 11. Each of circuits 10 and 11 includes a high Q tank circuit 16, 17 respectively serving to eliminate a transient spike in the recorded pulse.

Each of circuits 10, 11 is maintained normally deactivated with oscillators free running. The output from both the function selection signal oscillator and the command signal oscillator is normally grounded out via a circuit across the two output leads therefrom.

Means are provided, however, whereby each circuit can be activated to record via the recording head 12. Accordingly, each of circuits 10, 11 respectively includes a grounded lead 18, 19. In circuit 10 a switch 21 is normally closed but can be opened by energizing a coil K1 as shown in FIGURE 2. In circuit 11 the output is normally shorted out to ground via lead 19 by means of a circuit including a pair of make and break contact points 22. Points 22 are actuated by a dial 23 in the nature of a telephone dial. The means serving to normally deactivate circuit 11 further includes a normally closed switch 24 which can be actuated by energizing the coil K3 of a command relay CR. Upon energizing command relay CR, the armature associated with coil K3 opens the switch 24. Opening switch 24 connects the lead 19 (ground) to a lead 25 including resistance element 26 and condenser 27 for purposes described further below.

Means for selecting the signal to be recorded is shown in FIGURE 1 and includes a 115 volt A.C. supply connected across the primary of a transformer T. The secondary of transformer T includes a full wave rectifying circuit 28 to provide a suitable supply voltage —V, for example of 24 volts on line 29. A selection register 30 is provided for exclusively selecting one of several functions to be performed. Register 30 includes a number of bi-stable binary devices such as manually settable switches 31 which are normally closed and which when any one is opened the others are conditioned to a closed state by suitable means schematically represented by the mechanical connection indicated by dashed line 31*a*. As shown in FIGURE 1 there are eleven such switches which are respectively related to the following functions: frame change, timer, "D" release, tape drive "stop," four switches A, B, C, D representing four possible answer selections which can be registered by one of four pushbuttons at a student station, paper feed, warning buzzer, and finally a switch representing a bi-stable binary circuit for either turning the room lights on and the projector off or vice versa. The foregoing settable switches thus represent the functional circuits as provided in the above-identified copending application. However, it is to be understood that other circuits and systems utilizing a plurality of predetermined circuits, any one of which is to be selected to perform a related function, can be controlled by a magnetic tape prepared in accordance with the present invention.

Switches 31 are arranged in register 30 in a predetermined sequence of positions which is a continuous sequence. Thus it is to be understood that the condition of switches 31 is scanned from top to bottom, as shown, and then proceeds from the lowermost position immediately back to the topmost position, whereby the next successive position after the bottommost is the topmost.

Means are provided for sensing the state or condition of each switch 31. This sensing means includes a stepping switch having a plurality of mechanically coupled wipers 32*a*, 32*b*, 32*c*, 32*d*. Three banks of contacts are associated with the stepper and designated respectively 33*a*, 33*b* and 33*d*. A partial "bank" 33*c* having but a single contact is also associated with the stepper for a purpose as will be described below. The wipers 32 of the stepping switch are stepped from one position to the next by energizing a coil K1 of stepping relay SR. Coil K1 is in series with a pair of contacts 34 which are opened by rotating the telephone style dial 23 from its "home" position. The circuit continues via conductor 35 to line 36 and to ground through the armature 37, shown in its normal condition, i.e., with coil K2 de-energized.

Means are further provided whereby the rate and duration of the function selection signals is positively controlled so as to insure proper detectability of these signals when they are reproduced. Thus a lead 38 connected to the —V supply leads through the armature 39 of stepping relay SR to a lead 41, a resistance element 42, and to ground via a parallel circuit 40. Circuit 40 normally has only two branches formed respectively with a condenser 43 and the coil K2. A third branch including resistance element 44 is temporarily included when coil K2 is energized. Resistor 44 serves to establish a predetermined discharge period for condenser 43.

The stepping operation of SR and movement of wipers 32 begins with the manual setting of one of switches 31. Assume that wiper 32*a* is initially located at one of switches 31, for example the "frame change" position, which is in an open condition from a previous operation. Setting another of switches 31, such as the "tape stop" position will close the frame change switch and serve to form a completed circuit from line 29 via the frame change switch 31, wiper 32*a*, coil K1, contacts 34, and armature 37 to ground. Having thus energized coil K1 armature 39 closes to complete a second circuit via the pulse repetition and duration control circuit traced from line 29, lead 38, armature 39, lead 41, and parallel circuit 40 now having only two branches. The period during which condenser 43 is being charged momentarily prevents coil K2 from transferring armature 37 whereby the stepping switch can proceed to the next position. However, after a predetermined period, when condenser 43 becomes fully charged coil K2 will transfer armature 37 de-energizing SR and establishing a three-branch parallel network including resistance element 44. Resistor 44 is selected to provide a period of discharge of condenser 43 which, upon release of coil K1 and opening of armature 39, will maintain coil K2 energized for a predetermined period whereby release of armature 37 is positively controlled.

After armature 37 is released by coil K2 the circuit via coil K1 is again established through the settable switch 31 of the "timer" position, and the operation is repeated. Ultimately the wiper 32*a* arrives at the contact of switch 31 for the "tape stop" position which was previously opened. At this time the stepwise advance of wipers 32 is terminated.

Inasmuch as the armature of stepping relay SR also serves to operate switch 21 from its normally closed condition, each actuation of relay SR serves to record via the transducer head a function selection signal.

Means have further been provided for visually indicating the selected switch, as well as for indicating each transient position of the stepping switch wiper 32*a* during its movement from one position to the next. Accordingly, the contacts of bank 33*b* are each connected to a light source 45 connected across the 115 volt A.C. supply. The contacts of bank 33*b* are arranged to be scanned by wiper 32*b* which moves in conjunction with the other wipers 32.

Means for manual actuation to record one or more "command" pulses via the transducer have been provided as now to be explained. For such functions as turning on room lights or sounding a buzzer only a single command signal is ordinarily necessary. On the other hand where one of the answers A, B, C, D is to receive a "weight" greater than one unit, a plurality of command pulses are entered into a counting circuit to adjust the score accordingly.

Command pulses are recorded by opening the short circuit branch in circuit 11 as mentioned above. For a single pulse this can be done by operation of a switch 24, or for several pulses by dial contacts 22. To record a single command pulse, i.e., to operate switch 24, there is provided a command relay CR having a coil K3 the armature of which operates switch 24. Coil K3 is connected to the —V supply voltage on line 29 and by lead 46 to the wiper 32*d*. The other side of bank 33*d* is provided with a common line 47 connected to condenser 27, resistance element 26, and then to a normally open contact point. It is to be noted that not all of the contacts of bank 33*d* need to be connected to line 47 as when contacts 22 are used, as will be explained below. A command pulse push button 48, normally open, is arranged to ground the lead 46 so as to energize coil K3 and bypass bank 33*d*.

As thus arranged command pulses are recorded by closing push button 48 so as to energize coil K3. As coil K3 is energized armature 24 is conditioned to ground the CR circuit through bank 33*d* and at the same time activate the recording circuit 11. As the CR circuit through bank 33*d* is grounded condenser 27 will become charged maintaining CR energized even after releasing the pushbutton 48. After charging of condenser 27, armature 24 opens and coil K3 will remain energized for a short period determined by the discharge of condenser 27. Thus a recording period of a predetermined minimum duration is assured notwithstanding the fact that the pushbutton 48 may only be depressed for an extremely short period.

When a plurality of command pulses are to be entered to "weight" the score this is mechanically done by rotation of dial 23 by an appropriate amount and accordingly it is not necessary to utilize bank 33*d* at this time. If it is desired to assure an even longer recorded command signal for any one of the positions on bank 33*d*, an appropriate condenser can be associated individually with the particular contact.

Means for inhibiting the stepping relay from sensing the settable switches 31 have been provided responsive to actuation of the dial 23. This serves to prevent accidental actuation of the sensing means by inadvertently pressing one of the settable switches 31 during the entry of the "weighting" pulses. As shown in FIGURE 2, dial 23 includes a pair of off-normal contacts 34 which open at the first rotational movement of dial 23. Therefore, any time a number of command pulses are being entered so as to "weight" an answer the means for sensing the condition of the switches is inhibited.

Means are provided for manually setting up in advance a complete predetermined sequence of function selection and command pulses to record same which will serve to perform a plurality of functions in a particular order when the record medium is utilized as in the using system referenced above. This sequence for example can include a plurality of command pulses which will serve to "weight" an answer; a plurality of function selection signals serving to advance the stepping switch of the using system to the frame change position; and recording a command pulse automatically at that time which will serve to change the frame and display the correct answer.

For the above purpose a normally open pushbutton 49 is provided which is manually settable to automatically record a command signal via the transducer arrangement after the stepping switch wipers 32 have advanced to the "frame change" position. Thus, it can be seen that the above sequence is performed by first rotating the dial 23 to the desired value, depressing the frame change switch 31 and also the "frame only" switch 49. As dial 23 is released a series of command signals will be recorded via contacts 22. When dial 23 comes to rest at its home position, contacts 34 close to complete the circuit of coil K1 thereby serving to advance the stepping switch stepwise (and record function selection pulses) until the "frame change" position is reached. Further advance is precluded by the open "frame change" switch 31. At this time wiper 32c will come upon contact 33c and coil K3 will become energized to open the switch 24 as soon as coil K2 releases armature 37.

The operation of the invention is as follows:

A magnetic recording tape is prepared with the lecture or other audio information along one recording track thereof. After preparing the tape with the lecture, control signals are then applied along another track of the recording tape while listening to the lecture so as to appropriately correlate the operation of the system to the lecture being delivered.

Assuming that the last previously selected switch of the register 30 was the "frame change" switch 31 and therefore wiper 32a is at this position, and further assuming the room lights are on, let it be assumed that it is desired to sequentially perform the following sequence of functions: turning on the projector (which turns off the room lights); advancing the projector one frame to show a picture which is described by the lecture material from the tape recording; advancing the projector another frame to ask a question relating to the picture previously shown; entering a weight of 7 points for the correct answer which will be assumed to be "C"; advancing the projector an additional frame to display the correct answer; turning on the room lights and finally stopping the lecture tape.

The foregoing sequence can be performed by pushing the projector/room lights switch 31, thereby opening the same and closing all others. As the "frame change" switch 31 closes, stepping relay SR begins stepping downwardly toward the bottommost position 31 recording a function signal by opening switch 21 of circuit 10 prior to each advance. The pulse repetition rate and duration is controlled by the charge and discharge times of condenser 43. After wiper 32a has arrived at the room lights switch 31, a command pulse is recorded by pressing pushbutton 48. This energizes coil K3, which remains open a controlled period in accordance with the discharge time of condenser 27. Similarly, to advance the frame to project a picture under discussion, the "frame change" switch 31 is depressed thereby recording one function selection pulse. Subsequently one command pulse is recorded by depressing pushbutton 48. Another command pulse is also recorded which will serve to advance the projector one more frame so as to present a question. These pulses are recorded at appropriate times during the lecture in correlation to the audio track of the tape.

Since it has been assumed that the correct answer to the question previously asked will be "C" and that it will receive a weight of 7 points, depressing switch 31 for the "C" position will enter six function selection pulses on the magnetic tape. Subsequently, dial 23 is rotated to the 7 position and released whereby 7 command pulses are entered upon the tape by opening contacts 22 seven times. During this time it is impossible to advance stepping relay SR by virtue of the inhibiting contacts 34 which opened as soon as dial 23 was rotated. In order to display the correct answer to the question asked, the "frame change" switch 31 is depressed thereby entering five function selection pulses onto the tape. If at the same time the "frame only" pushbutton 49 is closed a command pulse will be automatically entered as soon as the wipers 32 arrive at the "frame change" position, since wiper 32c will complete a circuit energizing coil K3. This automatically recorded command pulse therefore will serve to advance the frame to display the answer.

To turn the room lights "on" and projector "off," the "projector/room lights" position of register 30 is conditioned to its open state to apply ten function selection signals. A command pulse is then entered by switch 48. Subsequently in the above assumed example it is desired to stop the tape. Accordingly, the "tape stop" switch 31 is depressed thereby entering four function selection signals to be followed by a command signal recorded by means of depressing pushbutton 48. Due to the holding action of condenser 27, the duration of the command signal for stopping the tape will be sufficiently long to effect this last mentioned function regardless of how short a time switch 48 is closed.

Referring to the circuitry shown in FIGURE 1 with a $B^+$ of 200 volts a satisfactory recording arrangement has been provided using elements of the following types and values:

Resistance elements:
- 51—270 thousand ohms
- 52—10 thousand ohms
- 53—270 thousand ohms
- 54—200 thousand ohms
- 55—10 thousand ohms
- 56—200 thousand ohms
- 57—500 thousand ohms
- 58—200 thousand ohms
- 59—20 thousand ohms
- 60—270 thousand ohms
- 61—variable resistance to 500 thousand ohms
- 62—variable resistance to 500 thousand ohms Condensers:
- 63—0.1 microfarad
- 64—16.00 micromicrofarads (including stray and coil capacitance)
- 65—0.2 microfarad
- 66—0.1 microfarad (including stray and coil capacitance)
- 67—0.1 microfarad
- 68—adjustable condenser variable between 50 and 200 micromicrofarads Inductors:
- 69—1.6 henries
- 70—5.0 henries Command signal oscillator 71 and function selection signal oscillator 72 in the above instance were of conventional design and set respectively to generate signals of 3200 and 225 cycles per second. While it may in some instances be desirable, it is not necessary that the control signals be in the audio range so as to produce an audible tone. Nor is it necessary that the command signal be a signal of higher frequency than the function selection signal. In some instances the reverse may be preferred to preclude all possible chance of recording a command signal which, due to deceleration of the record medium, could be sensed as a function selection signal.

The bias oscillator, also of conventional design, was adjusted to generate an 80 kilocycle/second signal.

The purpose of resistances 52 and 55 is to avoid sharp discontinuities in the envelope of the recorded pulse. The opening and closing of the controlling contacts (for example, 22) is modified by the time necessary for the LC circuit to resonate or respond.

I claim:

1. In a system for selectively recording upon a record medium two kinds of control signal wherein one kind is adapted to serve as a function selection signal and the other kind is adapted to serve as a command signal, transducer means adapted to record upon a record medium, signal selection apparatus comprising means operatively coupled to said transducer means including a plurality of means settable between two conditions and means for sensing the condition of said plurality of means and recording a selected number of said function selection signals, via said transducer means, for each of said plurality of means sensed in one condition until said sensing means senses one of said plurality of means in the other condition, and means operatively coupled to said transducer means and operable for manual actuation to record a selected number of said command signals.

2. In a system for selectively recording upon a record medium two kinds of control signal wherein one kind is adapted to serve as a function selection signal and the other kind is adapted to serve as a command signal, transducer means adapted to record upon a record medium, signal selection apparatus comprising a register including a plurality of switches settable between a first and second condition and disposed in a predetermined sequence of positions, means for sensing in said sequence the condition of said switches starting with any one of said switches and recording a function selection signal, via said transducer means, for each of said switches sensed in said first condition until said sensing means senses one of said switches in said second condition, and means coupled to said transducer means and operable for manual actuation to record a selected number of said command signals.

3. In a system for recording control signals as defined in claim 2 wherein said sequence forms a continuous sequence of positions.

4. A system for recording signals as defined in claim 2 further including means operatively coupled to the sensing means for inhibiting same responsive to actuation of the last said means.

5. In a system for selectively recording upon a record medium two kinds of control signal wherein one kind is adapted to serve as a function selection signal and the other kind is adapted to serve as a commond signal, transducer means adapted to record upon a record medium, signal selection apparatus comprising a register including a plurality of switches manually settable between open and closed condition and disposed in a predetermined sequence of positions, means for sensing the condition of said switches in said sequence and recording a function selection signal, via said transducer means, for each of said switches sensed in said closed condition until said sensing means senses one of said switches in said open condition, and means coupled to said transducer means and operable for manual actuation to record a selected number of said command signals.

6. In a system for selectively recording upon a record medium two kinds of control signal wherein one kind is adapted to serve as a function selection signal and the other kind is adapted to serve as a command signal, transducer means adapted to record upon a record medium, signal selection apparatus comprising a plurality of binary selection devices arranged in a predetermined sequence, each of said devices being operable between a first and second condition, means for selectively actuating and exclusively conditioning any one of said devices to said first condition, means for sensing in said sequence the condition of others of said devices until said selected one is sensed, and means for recording, via said transducer means, a function selection signal corresponding to each of said others sensed whereby a number of function selection signals are recorded related to the positional displacement in a given direction between said selected one of said devices and the device last previously exclusively conditioned to said first condition.

7. A system as defined in claim 6 wherein said predetermined sequence of devices is disposed to form a continuous ring.

8. A recording system as defined in claim 6 further including means for visually indicating each device selected.

9. A recording system as defined in claim 6 further including means for positively controlling the rate and duration of recording said function selection signals to insure proper detectability of same.

10. A recording system as defined in claim 6 further including means manually settable to automatically record a command signal via said transducer after recording said related number of function selection signals when said selected one of the positions is a particular one of same.

11. In a system for selectively recording upon a record medium one or more of either of two kinds of control signal wherein one kind is distinguishable from the other kind by the frequency thereof, and wherein one kind is adapted to serve as a function selection signal and the other kind of signal is adapted to serve as a command signal, transducer means adapted to record both kinds of signal upon the record medium, signal selection apparatus comprising a plurality of binary selection devices arranged in a predetermined sequence disposed to form a continuous ring, each of said devices being operable between a first and second condition, means for selectively actuating and exclusively conditioning any one of said devices to said first condition, means for sensing in said sequence the condition of others of said devices until said selected one is sensed, means for recording, via said transducer means, a function selection signal corresponding to each of said others sensed, manually activated means serving to selectively record one or more command signals via said transducer means, means coupled to the last said means for insuring a recording period of a predetermined minimum duration for said command signals, and means responsive to said manually activated means for inhibiting said sensing means during recording of said command signals whereby a number of function selection signals are recorded corresponding to the positional displacement in a given direction between said selected one of said devices and the device last previously exclusively conditioned to said first condition, and whereby thereafter one or more command signals are recorded.

12. A recording system as defined in claim 11 wherein said sensing means includes a stepping switch.

13. In a system for selectively recording upon a record medium one or more of either of two kinds of control signal wherein one kind is distinguishable from the other kind by the frequency thereof, and wherein one kind is adapted to serve as a function selection signal and the other kind of signal is adapted to serve as a command signal, transducer means adapted to record both kinds of signal upon the record medium, signal selection apparatus comprising first circuit means normally deactivated for recording said function selection signals via said transducer, second circuit means normally deactivated for recording said command signals via said transducer, first and second means serving to activate said first and second circuit means respectively, a register including a plurality of manually settable switches operable between open and closed conditions, a stepping switch having a bank of contacts, each of said contacts being coupled respectively to one of said switches, said stepping switch having a wiper movable sequentially to all of said contacts, said first means being coupled to said wiper to respond to said switches set in the closed condition to activate said first circuit means, and means for stepping said wiper from one contact to the next until arriving at a contact associated with an open one of said switches to record one of said function selection signals via said transducer means prior to each advance of said wiper from one contact to the next, and manually activated means coupled to operate said second means for thereafter recording one or more command signals.

References Cited by the Examiner

UNITED STATES PATENTS

| | | | |
|---|---|---|---|
| 2,247,905 | 7/1941 | Bryce | 346—74 |
| 2,787,669 | 4/1957 | Flan et al. | 179—100.2 |
| 3,026,769 | 3/1962 | Thiele et al. | 179—100.2 |
| 3,059,063 | 10/1962 | Bailey et al. | 179—100.2 |

BERNARD KONICK, *Primary Examiner.*

A. BERNARD, V. P. CANNEY, *Assistant Examiners.*